July 12, 1960  B. BERGER  2,945,204
DESIGNATION STRIPS FOR APPARATUS
Filed June 5, 1957
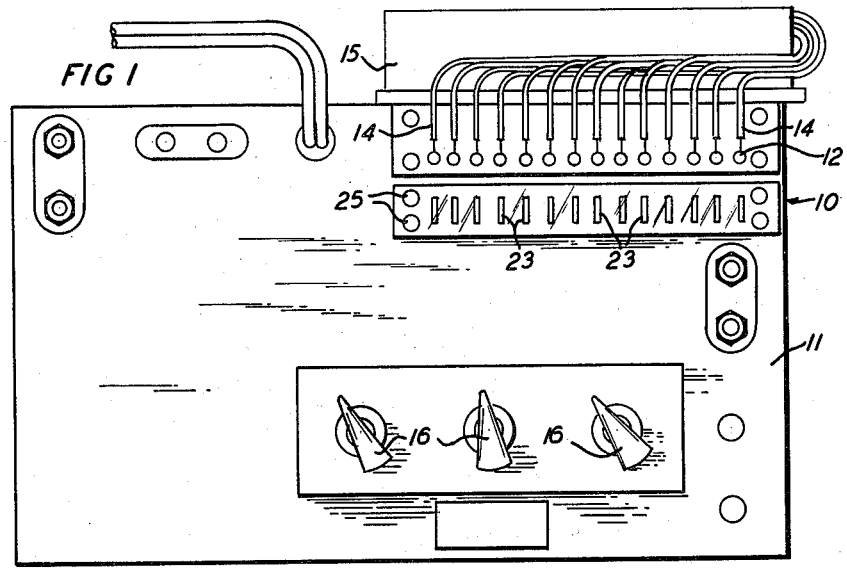
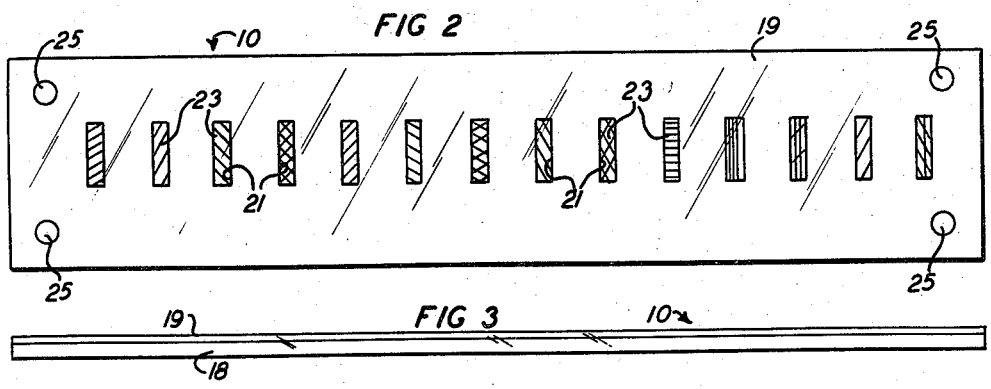
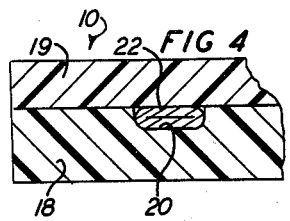 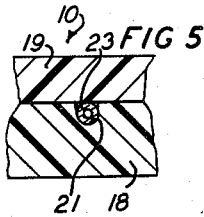
INVENTOR
B. BERGER
BY
ATTORNEY

United States Patent Office 2,945,204
Patented July 12, 1960

2,945,204

DESIGNATION STRIPS FOR APPARATUS

Brynjulf Berger, Winston-Salem, N.C., assignor to Western Electric Company, Incorporated, New York, N.Y., a corporation of New York Filed June 5, 1957, Ser. No. 663,785

2 Claims. (Cl. 339—113)

This invention relates to designation strips for apparatus particularly for designating required terminal connections for color coded wires.

In the communication arts, numerous multi-conductor electrical units must be tested and, if they pass the tests, installed in the equipment of which they are to be parts. Heretofore, written designations were provided adjacent the various terminals to which the respective wires of the units were to be connected. These written designations required accurate reading and interpretation thereof by the operators during testing and final mounting of the units to assure accurate connections of the wires with the proper terminals. Furthermore, any inaccuracies in the connections of the wires to the terminals would require complete checking and interpretation of the written designations to determine the locations of the inaccuracies.

The wires of all electrical units are color coded to facilitate accurate mounting of the electrical units in the equipment of which they are to be parts. The color codes of the wires are embodied in the insulating coverings for the wires which may be knitted or braided textile coverings or coverings of suitable plastics. Regardless of the material used to insulate the wires, the outermost covering of each wire is provided with either a single solid code color or multiple colors disposed in one or many designs to definitely distinguish any wire from all others.

The object of the present invention is a designation strip visually displaying color codes for correspondingly color coded wires to be secured to terminals.

The present embodiment of the invention according to the object thereof, includes a backing member having positioned thereon portions of insulated wires, corresponding in color codes to the insulated wires of units to be attached in a given order to terminals of an apparatus. The portions of insulated wires are spaced upon the backing member for alignment with the terminals of the apparatus and after the mounting of a transparent cover over the wire portions on the backing member the designation strip is mounted on the apparatus to position the color coded wire portions adjacent their respective terminals.

In the present embodiment of the invention, the backing member and the transparent cover are formed of suitable plastic materials, the backing member having pockets therein for the portions of color coded insulation or insulated wires to space them quickly and accurately according to the spacing of the terminals of the apparatus after which the strips are bonded together for mounting on the apparatus.

Other objects and advantages will be apparent from the following detailed description when considered in conjunction with the accompanying drawing, wherein:

Fig. 1 is a front elevational view of a testing apparatus embodying the invention for testing successive multi-conductor electrical units;

Fig. 2 is a front elevational view of the designation strip;

Fig. 3 is a bottom plan view of the designation strip, and

Figs. 4 and 5 are fragmentary sectional views of different species of designation strips for portions of color coded insulation or insulated wires.

The designation strip indicated generally at 10 is adapted for mounting on a testing apparatus 11 adjacent a plurality of terminals 12 to which the bare ends of insulated color coded wires 14 of one of a plurality of electrical units 15 may be connected for performing a series of tests on the successive units 15 through the actuation of certain controls 16. The speed at which the units may be connected successively electrically through the terminals 12 to the test set 11 depends largely upon the time required for connecting wires 14 to the terminals 12.

The designation strip indicated generally at 10 is composed of a backing member 18 and a cover 19. The backing member 18 is formed of a suitable plastic with pockets 20 or 21 (Figs. 4 and 5). The pockets 20 are of suitable depths and widths to receive lengths of color coded textile coverings while the measurements of the pockets 21 are to accommodate insulated wire portions wherein the insulation may be of plastic materials. Regardless of the contours of the pockets, the pockets in each instance are spaced according to the spacing of the terminals 12 and are of suitable lengths to display the color codes for the wires at each terminal position. The cover 19 is transparent and after the color coded insulation portions 22 in Figs. 1, 2 and 4, or the color coded wire portions 23 in Fig. 5 are disposed in their respective pockets 20—21, the strips composing the backing member 18 and the transparent cover 19 are bonded together in any suitable manner. Furthermore, the strips composing the backing member and the transparent cover may initially, or subsequent to being bonded together, be provided with apertures 25 for use in mounting the designation strip on the apparatus 11, as shown in Fig. 1.

With the use of the designation strip 10 on the apparatus 11, the operator is free of the responsibility of reading and interpreting written designations adjacent the terminals and need only select the color coded wires 14 of the unit 15, find a similar color code on the designation strip and connect the wire to the terminal in alignment therewith. This may be done rapidly because the color codes are readily distinguishable from each other and the color codes of the insulation and wire portions in the designation strip are identical with the color codes of the insulated wires 14. Furthermore, should it be possible for the operator to accidentially inaccurately attach two of the wires to wrong terminals, a single glance at the set of color codes wires and the designated color codes of the strip would reveal the locations of the inaccuracies.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A designation strip for an apparatus having aligned terminals at spaced positions to receive in a predetermined order color coded insulated wires, the designation strip comprising a backing member having portions of insulated wires, corresponding in color codes to the insulated wires of the units, disposed thereon in positions spaced for alignment with the terminals which are to receive the insulated wires of their respective code colors, a transparent cover for the backing member and the wire portions to complete the strip, means to mount the strip on the apparatus to position the color coded wire portions adjacent their respective terminals to facilitate attachment of the color coded wires to their respective terminals, the backing member and the transparent cover being formed of suitable plastic strips, with pockets in the backing member to receive and position the color coded insulated wire portions, and the strips bonded together.

2. A designation strip for an apparatus having a plurality of terminals and adapted to test electrical units successively when a plurality of wires, extending from each unit and separately identified by different color coded insulations on the wires, are connected in a predetermined order to the terminals which are disposed at definite spaced positions relative to each other on the apparatus, the designation strip comprising a backing member having pockets disposed therein at the same definite spaced positions relative to each other that the terminals are spaced from each other, the pockets being of given length to receive respectively lengths of portions of the color coded insulations corresponding to the color coded insulations on the wires to be attached to the terminals, a transparent cover for the backing member completing the strip and closing the pockets to retain the lengths of color coded insulation therein, and means to mount the strip on the apparatus in a position adjacent the terminals to locate the pockets with their length of color coded insulation adjacent to and extending longitudinally toward their respective terminals to identify the terminals to which the wires, with their identifying color coded insulations, are to be secured.

References Cited in the file of this patent

UNITED STATES PATENTS

| | | |
|---|---|---|
| 1,551,954 | Hodgart | Sept. 1, 1925 |
| 1,784,236 | Jones | Dec. 9, 1930 |
| 1,926,685 | Mitchell | Sept. 12, 1933 |
| 1,996,288 | Galt | Apr. 2, 1935 |
| 2,083,872 | Siegel | June 15, 1937 |
| 2,106,084 | Candy | Jan. 18, 1938 |
| 2,178,092 | Werner | Oct. 31, 1939 |
| 2,557,402 | Altheimer | June 19, 1951 |
| 2,578,444 | Nicolle | Dec. 11, 1951 |
| 2,671,888 | Hadden et al. | Mar. 9, 1954 |